(12) United States Patent  
Lu et al.

(10) Patent No.: US 7,720,337 B2  
(45) Date of Patent: May 18, 2010

(54) WAFER BASED OPTICAL INTERCONNECT

(75) Inventors: Daoqiang Lu, Chandler, AZ (US);  
Henning Braunisch, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/004,541

(22) Filed: Dec. 20, 2007

(65) Prior Publication Data

US 2009/0162005 A1    Jun. 25, 2009

(51) Int. Cl.  
G02B 6/36      (2006.01)

(52) U.S. Cl. ............................. 385/52; 385/88; 385/93

(58) Field of Classification Search .................. None  
See application file for complete search history.

(56) References Cited

U.S. PATENT DOCUMENTS

| | | | | |
|---|---|---|---|---|
| 5,581,523 A * | 12/1996 | Seki et al. | ............... | 369/44.11 |
| 5,917,976 A * | 6/1999 | Yamaguchi | ................. | 385/88 |
| 6,676,302 B2 * | 1/2004 | Cheng et al. | ................. | 385/88 |
| 6,724,961 B2 * | 4/2004 | Greene et al. | ................. | 385/52 |
| 6,729,771 B2 * | 5/2004 | Kim et al. | .................... | 385/76 |
| 6,915,049 B2 * | 7/2005 | Murata | ........................ | 385/52 |
| 7,068,892 B1 | 6/2006 | Lu et al. | | |
| 7,208,725 B2 * | 4/2007 | Sherrer et al. | ............... | 250/239 |
| 2001/0036342 A1 * | 11/2001 | Knecht et al. | ................. | 385/84 |
| 2002/0064347 A1 * | 5/2002 | Mertz et al. | .................... | 385/52 |

OTHER PUBLICATIONS

Morozova, N.D. et al., "Controlled Solder Self-alignment Sequence for an Optoelectronic Module without Mechanical Stops", *IEEE 1997 Electronic Components and Technology Conference*, (May 18-21, 1997), pp. 1188-1193.

Mohammed, E.M. et al., "Optical I/O technology for digital VLSI", *Proceedings of SPIE: Photonics Packaging and Integration IV* vol. 5358, San Jose, CA, (Jan. 24-29, 2004), pp. 60-70.

* cited by examiner

*Primary Examiner*—Mike Stahl  
(74) *Attorney, Agent, or Firm*—Ryder, Lu, Masseo and Konieczny, LLC; Douglas J. Ryder

(57) ABSTRACT

In general, in one aspect, a method includes forming conductive layers on a wafer. A through cavity is formed in alignment with the conductive layers. The through cavity is to permit an optical signal from an optical waveguide within an optical connector to pass therethrough. Alignment holes are formed on each side of the through cavity to receive alignment pins. The wafer having the conductive layers, the through cavity in alignment with the conductive layers, and the alignment holes on each side of the through cavity forms an optical-electrical (O/E) interface. An O/E converter is mounted to the metal layers in alignment with the through cavity. The alignment pins and the alignment holes are used to passively align the optical waveguide and the O/E converter.

17 Claims, 6 Drawing Sheets

WAFER BASED OPTICAL INTERCONNECT

BACKGROUND

Optical interconnects are utilized in both the telecommunication and data communication industries. The optical interconnects include optical waveguides or waveguide arrays (hereinafter when the term optical waveguide is used it encompasses waveguides and waveguide arrays) and an optical-electrical (O/E) converters (e.g., laser, photodetector) or converter arrays (hereinafter when the term O/E converter is used it encompasses converters and converter arrays). Alignment of the waveguide and the O/E converter may require active alignment. Active alignment is costly, slow and not compatible with manufacturing. Connectors may be utilized to guide the waveguide and the O/E converter together in alignment (passive alignment). However, the precision alignment required for the connectors may result in costly and slow manufacturing. Furthermore, the connector needs to be mounted to a substrate and provide the electrical connection between the O/E converter and the substrate. The fabrication of the electrical connection (e.g., metal pads and traces) on the connector may be difficult and costly.

BRIEF DESCRIPTION OF THE DRAWINGS

The features and advantages of the various embodiments will become apparent from the following detailed description in which.

DETAILED DESCRIPTION

An optical-electrical (O/E) interface connector to provide passive alignment of the waveguide and the O/E converter may be fabricated at the wafer level (e.g., silicon, glass). The O/E interface may include alignment holes to guide the waveguide into the O/E interface in alignment with the O/E converter. The O/E interface may include metal traces for connecting the O/E converter to the substrate (e.g., microprocessor located on the substrate) the O/E interface is mounted to. The metal traces and the alignment holes may be fabricated at wafer level. The O/E converter may also be assembled to the O/E interface at wafer level. The wafer O/E interface allows fabrication of advanced devices that integrate O/E conversion circuitry (e.g., active circuits such as transimpedance amplifiers, limiting amplifiers, and laser drivers and passive components such as capacitors) directly therein. The conversion circuitry may be required on the O/E interface for signal integrity.

Figure 1:
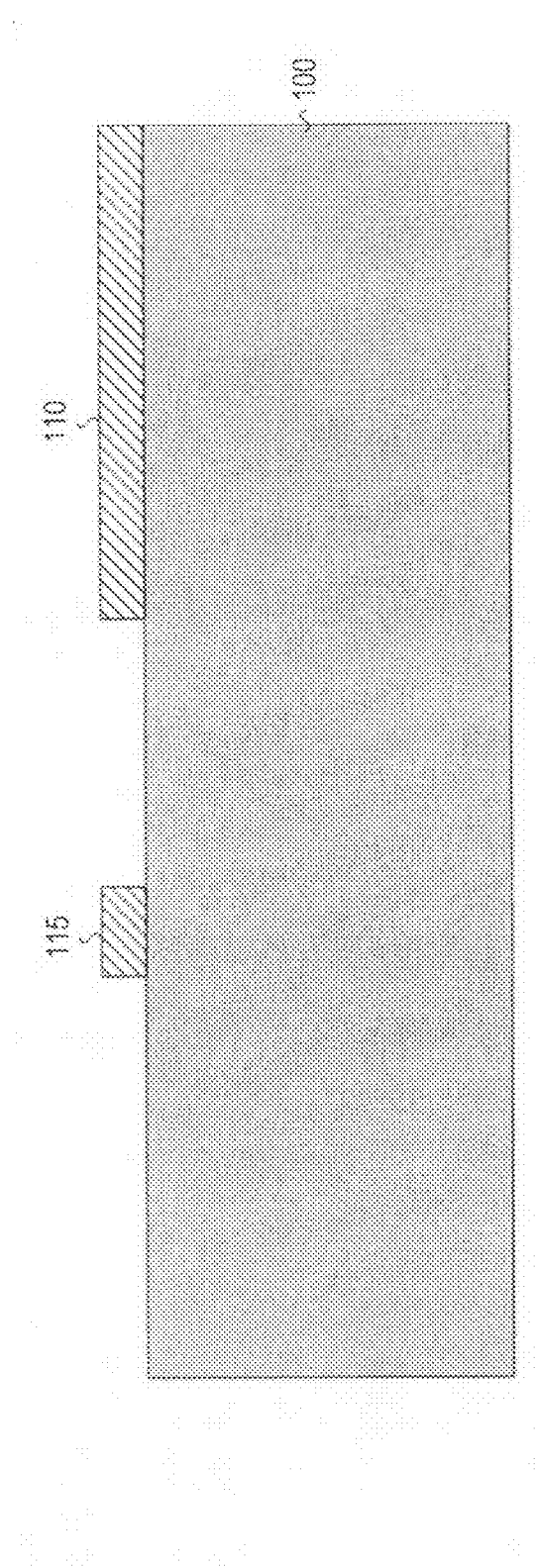
FIG. 1 illustrates an example wafer having metal traces fabricated on a top side thereof, according to one embodiment.

FIG. 1 illustrates an example wafer (e.g., silicon) 100 having conductive (e.g., metal) traces 110 and pads 115 fabricated on a top side thereof. The metal traces and pads 110, 115 may be fabricated using standard photolithography to achieve sub-micron precision. The wafer 100 may be a low-cost dummy polysilicon wafer or may be a functional wafer integrating laser drivers and/or transimpedance and limiting amplifiers for optical reception using photodetectors. It may also contain integrated passive components such as capacitors. It should be noted that FIG. 1 illustrates a dummy wafer and that the remaining figures illustrate the wafer having advanced devices (e.g., amplifiers, drivers) 105 formed therein.

Figure 2:
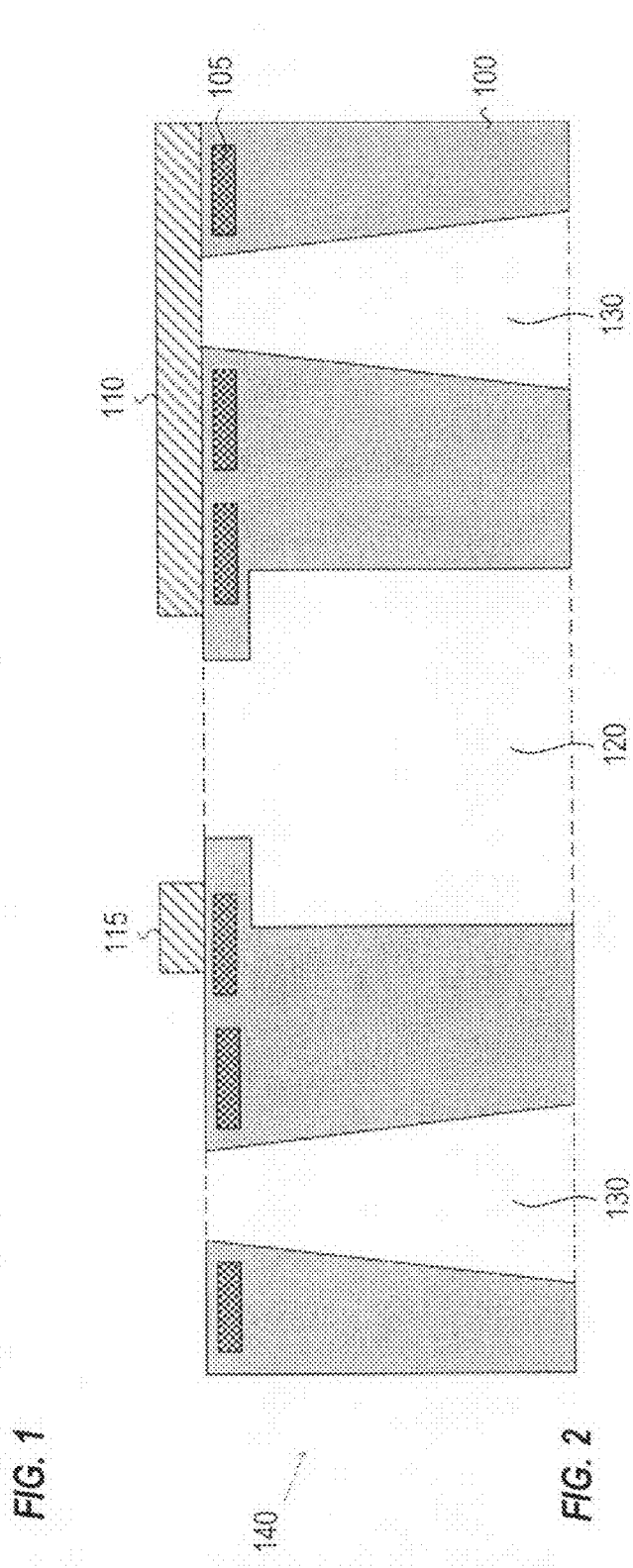
FIG. 2 illustrates the example wafer after a through cavity and alignment holes are formed therein, according to one embodiment.

FIG. 2 illustrates the example wafer after a through cavity 120 and alignment holes 130 are formed therein. The through cavity 120 and the alignment holes 130 are fabricated from the secondary side of the wafer 100. The through cavity 120 and the alignment holes 130 may be defined using photolithography with an infrared (IR) vision system. The IR vision system can see through the wafer 100 and define the through cavity 120 and the alignment holes 130 in a patterning layer with respect to the metal traces/pads 110, 115 on the wafer top side. The diameters and locations of the through cavity 120 and the alignment holes 130 with respect to the metal traces/pads 110, 115 may be precisely controlled. The through cavity 120 may be etched first followed by the etching of the alignment holes 130 on each side thereof. The alignment holes 130 may be slightly tapered to better guide alignment pins of an external connector (e.g., connector containing a waveguide). The wafer is now an O/E interface 140 that can be used to connect in alignment the waveguide and the O/E converter.

Figure 3:
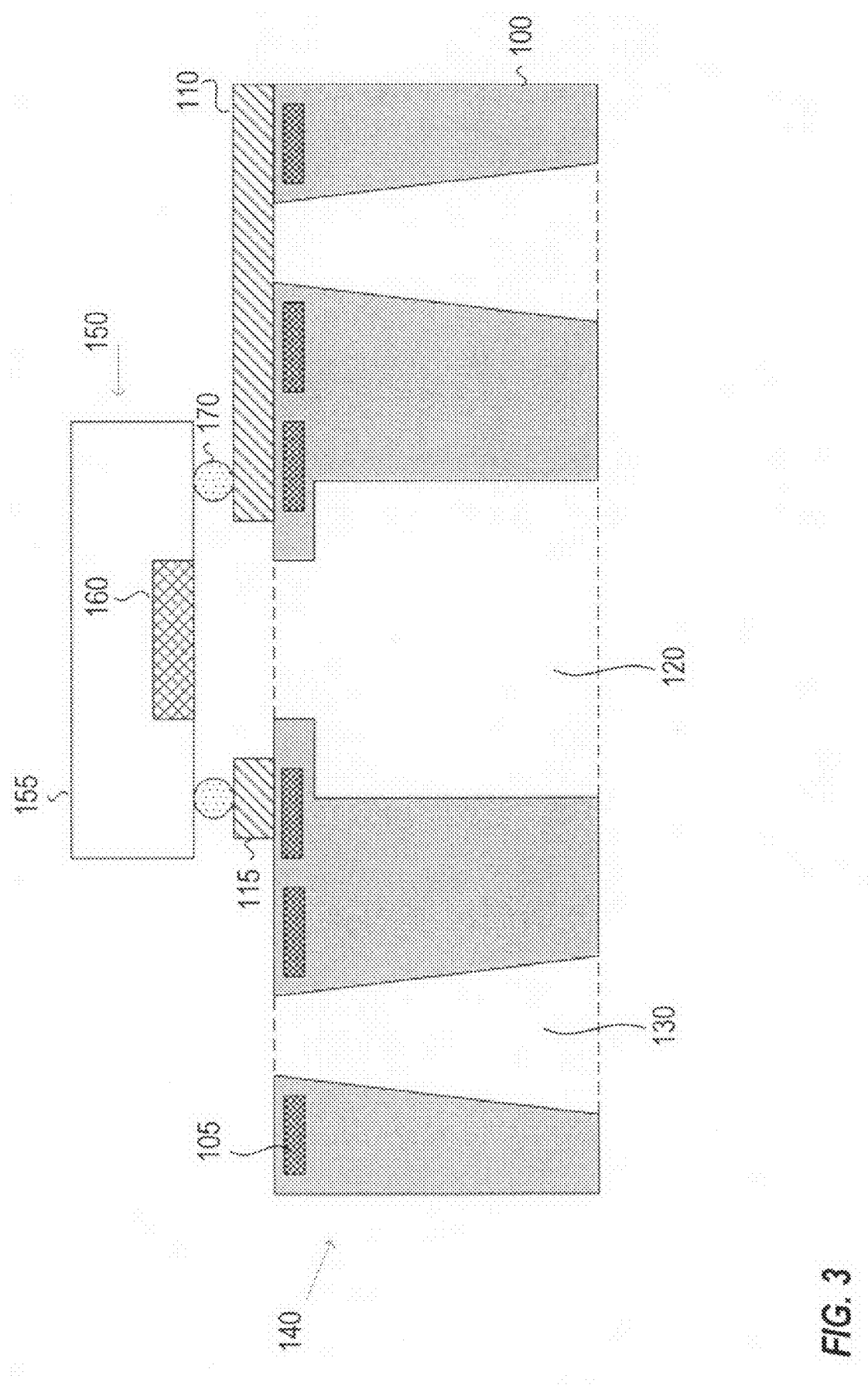
FIG. 3 illustrates an example O/E converter flip chip attached onto the example O/E interface, according to one embodiment.

FIG. 3 illustrates an example O/E converter 150 (e.g., vertical-cavity surface-emitting laser (VCSEL), photodetector (PD)) flip chip attached onto the example O/E interface 140. The O/E converter 150 may include a substrate 155 and an emitting or receiving area 160. During flip chip attach, the emitting/receiving area 160 will be centered by solder self-alignment of solder bumps 170 with the metal traces/pads 110, 115. It should be noted that FIGS. 1-3 have illustrated a wafer being manufactured into a single O/E interface 140 for ease of illustration. The manufacturing may entail a plurality of O/E interfaces 140 being formed from a wafer and having a plurality of O/E converters 150 mounted thereto and then having the wafer diced into individual parts.

Figure 4:
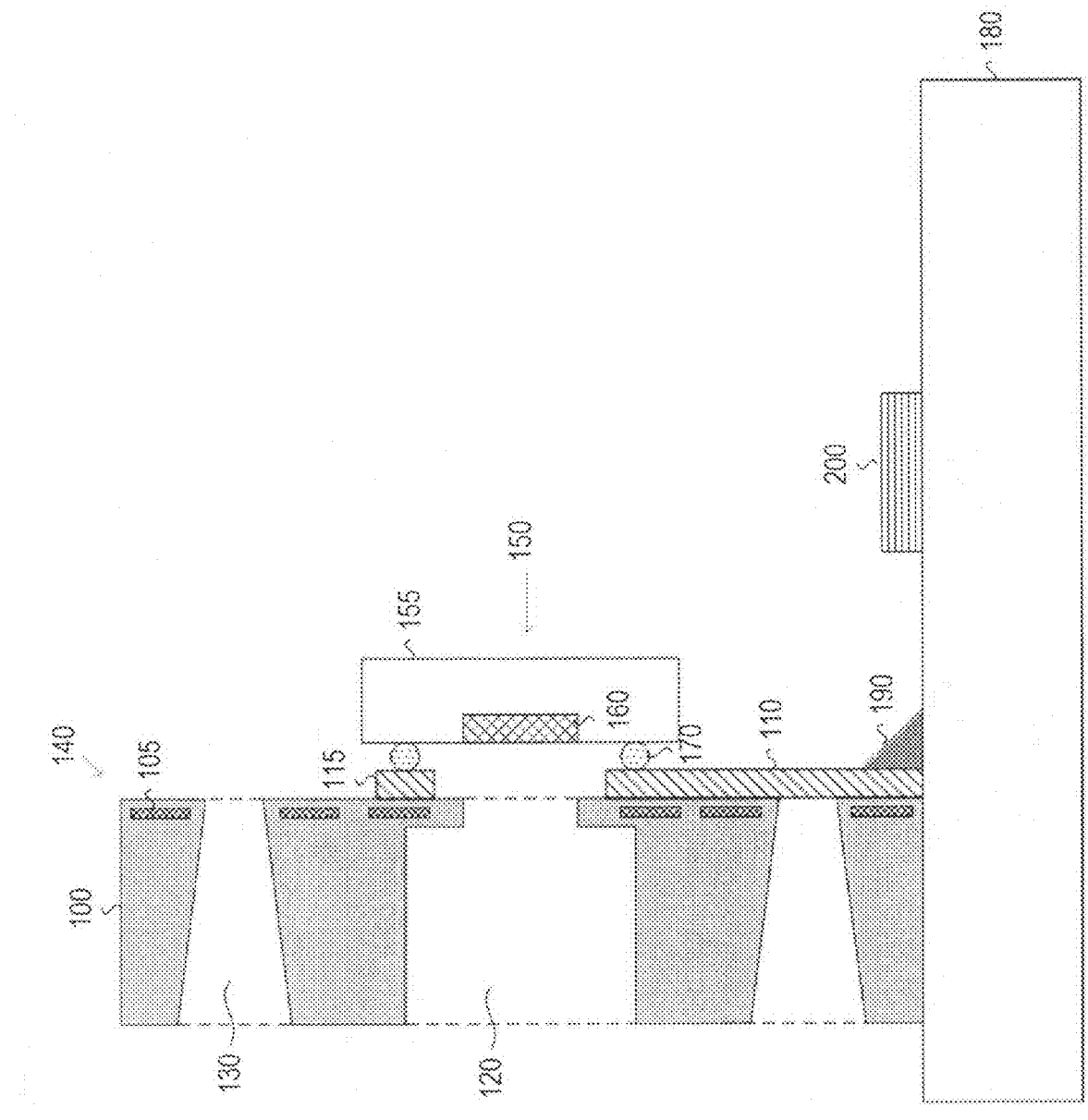
FIG. 4 illustrates the example O/E interface and the attached example O/E converter attached onto an example substrate, according to one embodiment.

FIG. 4 illustrates the example O/E interface 140 and the attached example O/E converter 150 attached onto an example substrate 180, for example, using a solder joint 190. The traces 110 on the O/E interface 140 may be in alignment with conductive (e.g., metal) traces and/or pads (not illustrated) on the substrate 180. The traces 110 and the traces/pads on the substrate may provide the electrical connection between the O/E converter 150 and die 200 (e.g., microprocessor) contained on the substrate 180.

It should be noted that the O/E interface 140 may require a suitable retention mechanism and/or further packaging (e.g., overmolding techniques, addition of optically and electrically non-functional plastic parts, spring clips) in order to hold and support a waveguide.

Figure 5:
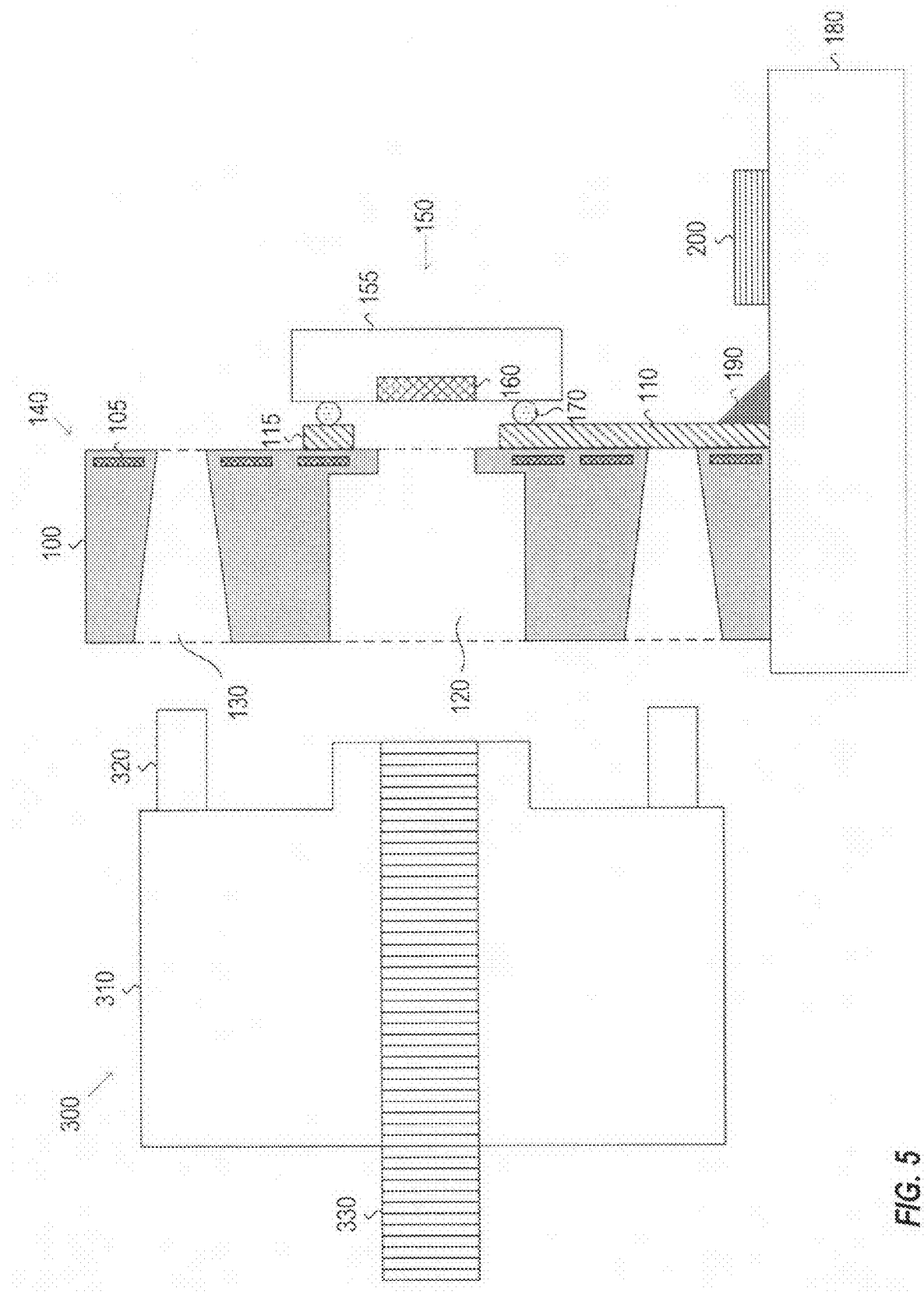
FIG. 5 illustrates an example optical connector being connected to the example O/E interface, according to one embodiment.

FIG. 5 illustrates an example optical connector 300 being connected to the example O/E interface 140. The optical connector 300 includes a connector body 310, alignment pins 320, and a waveguide 330. The alignment pins 320 protrude from a front face of the body 310 so as to fit within the alignment holes 130. The waveguide 330 also protrudes from the front face so as to fit within the through cavity 120. Inserting the alignment pins 320 into the alignment holes 130 will passively align (in x, y and z directions) the waveguide 330 and the emitting/receiving area 160 of the O/E converter 150.

Figure 6:
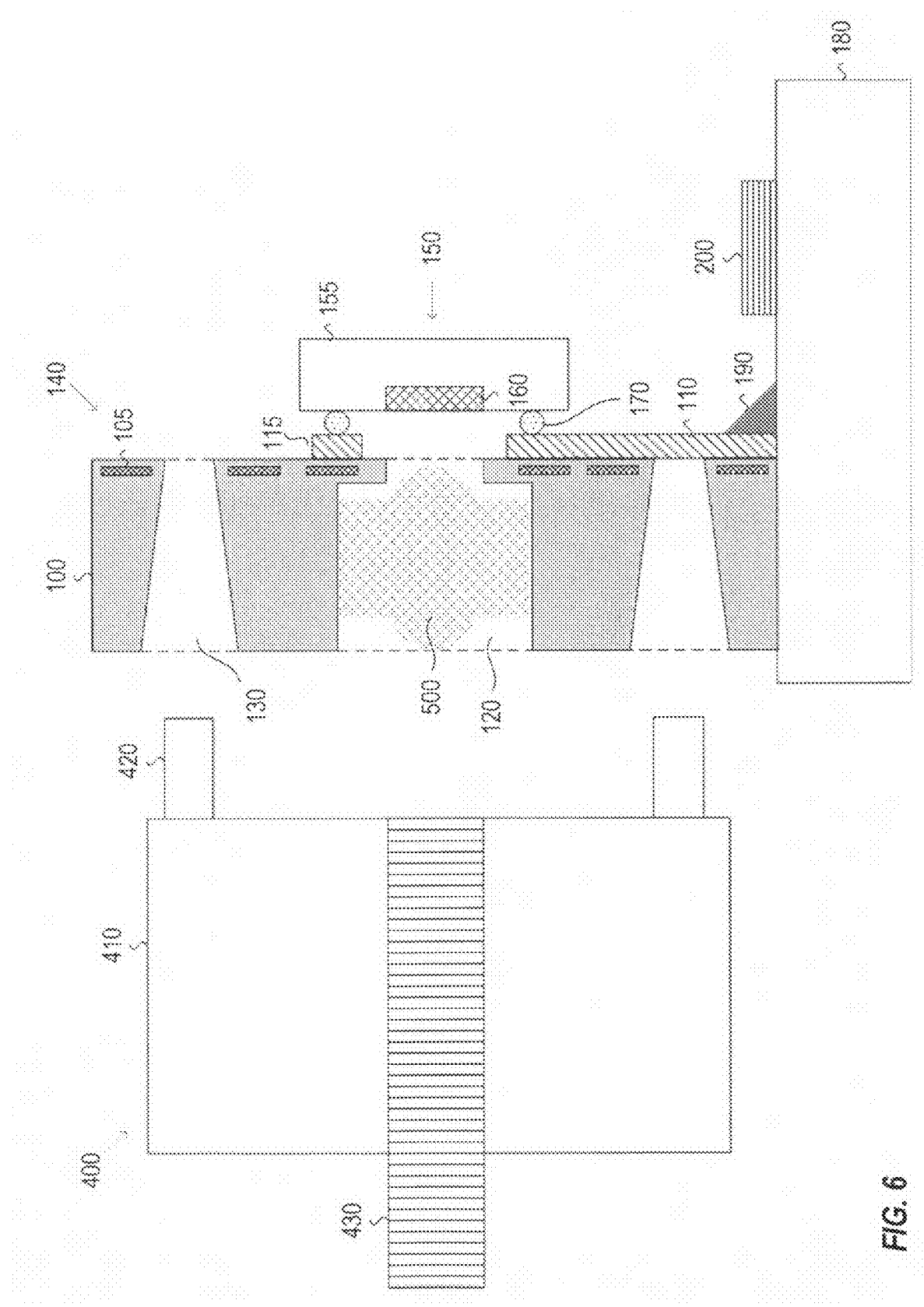
FIG. 6 illustrates an example optical connector being connected to the example O/E interface, according to one embodiment.

FIG. 6 illustrates an example optical connector 400 being connected to the example O/E interface 140. The waveguide 430 does not protrude from the front face of the connector body 310 so that the waveguide 430 will not fit within the through cavity 120 when the alignment pins 420 are inserted into the alignment holes 130. Accordingly, a lens insert 500 is fit within the through cavity 120 to ensure the optical signal (which may include visible light waves as well as invisible radiative energy (e.g., IR, ultra violet) from the waveguide 430 is received by the emitting/receiving area 160. The lens insert 500 may be molded with high precision.

Figure 7:
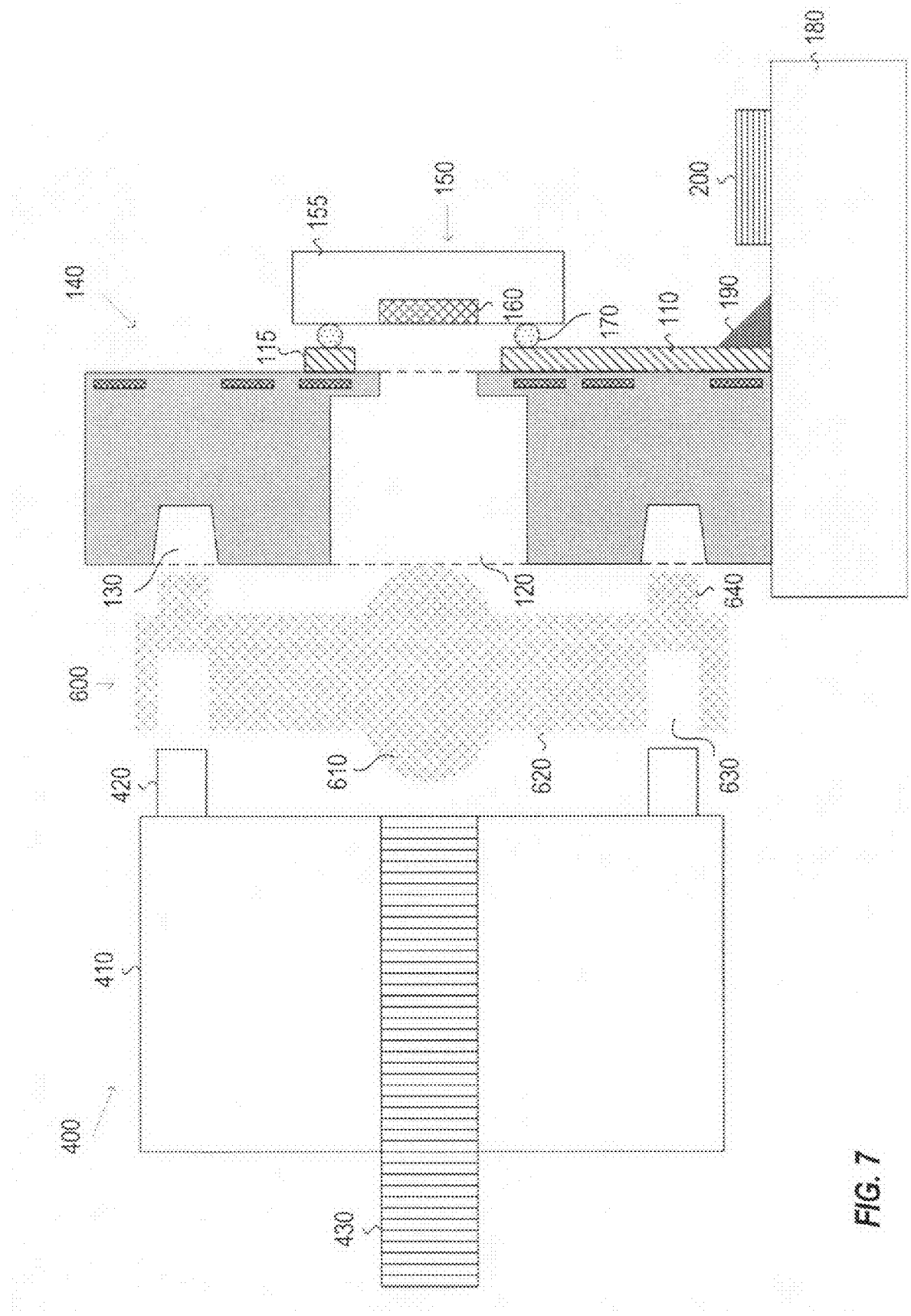
FIG. 7 illustrates the example optical connector being connected to the example O/E interface via an example optical and mechanical adapter, according to one embodiment.

FIG. 7 illustrates the example optical connector 400 being connected to the example O/E interface 140 via an example optical and mechanical adapter 600. The adapter 600 may include a lens 610 and a body 620. The body may include alignment holes 630 for receiving the alignment pins 420 and alignment pins 640 for entering the alignment holes 130. The adapter 600 may provide additional support for the optical connector 400 while at the same time providing the lens 610 needed to ensure the light from the waveguide 430 is received by the emitting or receiving area 160. The adapter 600 may be molded with high precision.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A method comprising
   forming conductive layers on a wafer;
   forming a through cavity in alignment with the conductive layers, wherein the through cavity is to permit an optical signal from an optical waveguide within an optical connector to pass therethrough, wherein forming the through cavity includes
      patterning the through cavity on opposite side of the conductive layers, wherein an infrared (IR) system is used to see the conductive layers and pattern the through cavity in alignment therewith; and
      etching the wafer based on the patterning; and
   forming alignment holes on each side of the through cavity to receive alignment pins, wherein the wafer having the conductive layers, the through cavity in alignment with the conductive layers, and the alignment holes on each side of the through cavity forms an optical-electrical (O/E) interface.

2. The method of claim 1, further comprising mounting an O/E converter to the conductive layers in alignment with the through cavity, wherein the alignment pins and the alignment holes are used to passively align the optical waveguide and the O/E converter.

3. The method of claim 1, further comprising mounting the O/E interface to a substrate so that the conductive layers on the O/E interface align with conductive traces on the substrate.

4. The method of claim 1, wherein the patterning includes patterning a resist layer using photolithography.

5. The method of claim 1, wherein the forming alignment holes includes forming tapered alignment holes.

6. The method of claim 2, further comprising mounting the optical connector to the O/E interface by inserting the alignment pins in the optical connector into the alignment holes, wherein the optical waveguide will be in alignment with the O/E converter.

7. The method of claim 1, further comprising inserting a lens insert into the through cavity.

8. The method of claim 2, further comprising
   mounting an optical and mechanical adapter to the O/E interface, wherein the optical and mechanical adapter includes a lens, alignment pins, and alignment slots, wherein the alignment pins are inserted in the alignment holes in the O/E interface and the lens fits within the through cavity and is in alignment with the O/E converter; and
   mounting the optical connector to the optical and mechanical adapter by inserting alignment pins in the optical connector into the alignment slots in the optical and mechanical adapter, wherein the optical waveguide will be in alignment with the lens and the O/E converter.

9. The method of claim 2, further comprising attaching a retention mechanism to the O/E interface and the optical connector.

10. An wafer based optical-electrical (O/E) interface comprising
    a wafer having at least some subset of laser drivers, transimpedance amplifiers, and limiting amplifiers formed therein;
    metal layers formed on one surface of the wafer;
    a through cavity formed in the wafer in alignment with an opening between the metal layers;
    alignment holes formed in the wafer on each side of the through cavity; and
    an optical and mechanical adapter within the through cavity, wherein the optical and mechanical adapter includes a lens, alignment pins, and alignment slots.

11. The apparatus of claim 10, further comprising an O/E converter mounted to the metal layers in alignment with the through cavity.

12. The apparatus of claim 10, wherein the metal layers are in alignment with metal pads on a substrate that the O/E interface is to be mounted to.

13. The apparatus of claim 10, wherein the wafer is glass.

14. The apparatus of claim 10, wherein the wafer is silicon.

15. The method of claim 1, further comprising forming a wafer having at least some subset of laser drivers, transimpedance amplifiers, and limiting amplifiers formed therein.

16. The method of claim 15, wherein the forming a wafer includes forming a silicon layer having at least some subset of laser drivers, transimpedance amplifiers, and limiting amplifiers formed therein.

17. The method of claim 15, wherein the forming a wafer includes forming a glass layer having at least some subset of laser drivers, transimpedance amplifiers, and limiting amplifiers formed therein.

* * * * *